United States Patent
Battaiola Kreling et al.

(10) Patent No.: US 10,754,776 B2
(45) Date of Patent: Aug. 25, 2020

(54) CACHE BALANCE WHEN USING HARDWARE TRANSACTIONAL MEMORY

(71) Applicant: INTERNATIONAL BUSINESS MACHINES CORPORATION, Armonk, NY (US)

(72) Inventors: Daniel Battaiola Kreling, Santa Bárbara d'Oeste (BR); Breno H. Leitao, Araraquara (BR); Mauro Sergio Martins Rodrigues, Campinas (BR); Rafael Camarda Silva Folco, Santa Bárbara d'Oeste (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/048,871

(22) Filed: Jul. 30, 2018

(65) Prior Publication Data
US 2020/0034295 A1    Jan. 30, 2020

(51) Int. Cl.
*G06F 12/0815* (2016.01)
*G06F 12/0804* (2016.01)

(52) U.S. Cl.
CPC ...... *G06F 12/0815* (2013.01); *G06F 12/0804* (2013.01); *G06F 2212/1032* (2013.01); *G06F 2212/154* (2013.01)

(58) Field of Classification Search
CPC ............ G06F 12/0815; G06F 12/0804; G06F 12/0806; G06F 2212/1032; G06F 2212/154
See application file for complete search history.

(56) References Cited

U.S. PATENT DOCUMENTS

| | | | |
|---|---|---|---|
| 9,471,313 B1* | 10/2016 | Busaba | G06F 9/30058 |
| 2007/0143287 A1 | 6/2007 | Adl-Tabatabai et al. | |
| 2008/0040551 A1 | 2/2008 | Gray et al. | |
| 2011/0016470 A1* | 1/2011 | Cain, III | G06F 9/528 |
| | | | 718/101 |
| 2011/0119452 A1 | 5/2011 | Heller, Jr. | |
| 2013/0185488 A1* | 7/2013 | Talagala | G06F 12/0246 |
| | | | 711/103 |

(Continued)

OTHER PUBLICATIONS

Ruan et al., "Hybrid Transactional Memory Revisited", https://hal.archives-ouvertes.fr/hal-01206445, HAL archives-ouvertes.fr, Tokyo, Japan, Springer-Verlag Berlin Heidelberg, LNCS 9363, 29th International Symposium on Distributed Computing, Sep. 29, 2015, 16 pages.

(Continued)

*Primary Examiner* — Michael Krofcheck
(74) *Attorney, Agent, or Firm* — William Hartwell; Andrew D. Wright; Roberts Calderon Safran & Cole, P.C.

(57) ABSTRACT

Systems and methods for cache balance when using hardware transactional memory are disclosed. A method includes: determining, by a computing device, a hardware transactional memory (HTM) attrition rate for a workload in a distributed computing environment; determining, by the computing device, whether or not the HTM attrition rate for the workload exceeds a predetermined threshold; and in response to determining that the HTM attrition rate for the workload does not exceed the predetermined threshold, the computing device causing a requested HTM transaction to begin.

20 Claims, 11 Drawing Sheets

(56) References Cited

U.S. PATENT DOCUMENTS

| | | | | |
|---|---|---|---|---|
| 2014/0215160 | A1* | 7/2014 | Kocberber | G06F 12/0897 711/134 |
| 2015/0089159 | A1* | 3/2015 | Busaba | G06F 12/0817 711/144 |
| 2015/0277967 | A1 | 10/2015 | Calciu et al. | |
| 2017/0039068 | A1 | 2/2017 | Kumar et al. | |
| 2018/0143850 | A1* | 5/2018 | Avni | G06F 11/1441 |

OTHER PUBLICATIONS

Prisagjanec et al., "Reducing Competitive Cache Misses in Modern Processor Architectures", https://www.researchgate.net/publication/303895846_Reducing_Competitive_Cache_Misses_in_Modern_Processor_Architectures, International Conference on Applied Internet and Information Technologies (AIIT 2016), Bitola, Macedonia, Jun. 2016, 7 pages.

Katti et al., "Competitive Cache Replacement Strategies for Shared Cache Environments", http://www.cs.utexas.edu/~vlr/papers/ipdps12-AR.pdf, accessed Jul. 27, 2018, 12 pages.

Hardavellas et al., "Reactive NUCA: Near-Optimal Block Placement and Replication in Distributed Caches", http://www.ece.cmu.edu/~ece740/f13/lib/exe/fetch.php?media=hardavellas09_rnuca.pdf, ISCA'09, Jun. 20-24, 2009, Austin, Texas, 12 pages.

Kowarschik et al., "An Overview of Cache Optimization Techniques and Cache{Aware Numerical Algorithms", http://www.cc.gatech.edu/~bader/COURSES/UNM/ece637-Fall2003/papers/KW03.pdf, Apr. 2003, 23 pages.

Mell et al., "The NIST Definition of Cloud Computing", NIST, Special Publication 800-145, Sep. 2011, 7 pages.

* cited by examiner

CACHE BALANCE WHEN USING HARDWARE TRANSACTIONAL MEMORY

BACKGROUND

The present invention generally relates to computing devices and, more particularly, to systems and methods for cache balance when using hardware transactional memory.

Hardware transactional memory (HTM) is a model for controlling concurrent memory accesses in the scope of parallel programming and is an alternative to lock-based synchronization. Similar to a database transaction, within the scope of a transaction, HTM either commits or discards (e.g., in the event of a conflict) all shared memory accesses and their effects (i.e., all changes inside of the transaction). HTM provides for atomicity (e.g., all speculative memory updates of a transaction are either committed or discarded as a unit), consistency (e.g., memory operations of a transaction take place in order, and transactions are committed one at a time), and isolation (e.g., memory updates are not visible outside of a transaction until the transaction commits data).

SUMMARY

In a first aspect of the invention, there is a method that includes: determining, by a computing device, a hardware transactional memory (HTM) attrition rate for a workload in a distributed computing environment; determining, by the computing device, whether or not the HTM attrition rate for the workload exceeds a predetermined threshold; and in response to determining that the HTM attrition rate for the workload does not exceed the predetermined threshold, the computing device causing a requested HTM transaction to begin.

In another aspect of the invention, there is a computer program product that includes a computer readable storage medium having program instructions embodied therewith. The program instructions are executable by a computing device to cause the computing device to: receive information on a number of times a cache has been flushed due to hardware transactional memory (HTM) transactions; receive information on a number of cache misses; determine an HTM attrition rate for a workload in a distributed computing environment using the received information on the number of times the cache has been flushed due to HTM transactions and the received information on the number of cache misses; and determine, based on the determined HTM attrition rate, whether or not to permit an HTM transaction requested by the workload to begin.

In another aspect of the invention, there is a system that includes: a hardware processor, a computer readable memory, and a computer readable storage medium associated with a computing device; program instructions configured to determine a hardware transactional memory (HTM) attrition rate for a workload in a distributed computing environment; program instructions configured to determine whether or not the HTM attrition rate for the workload exceeds a predetermined threshold; and program instructions configured to cause a requested HTM transaction to begin in response to determining that the HTM attrition rate for the workload does not exceed the predetermined threshold, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
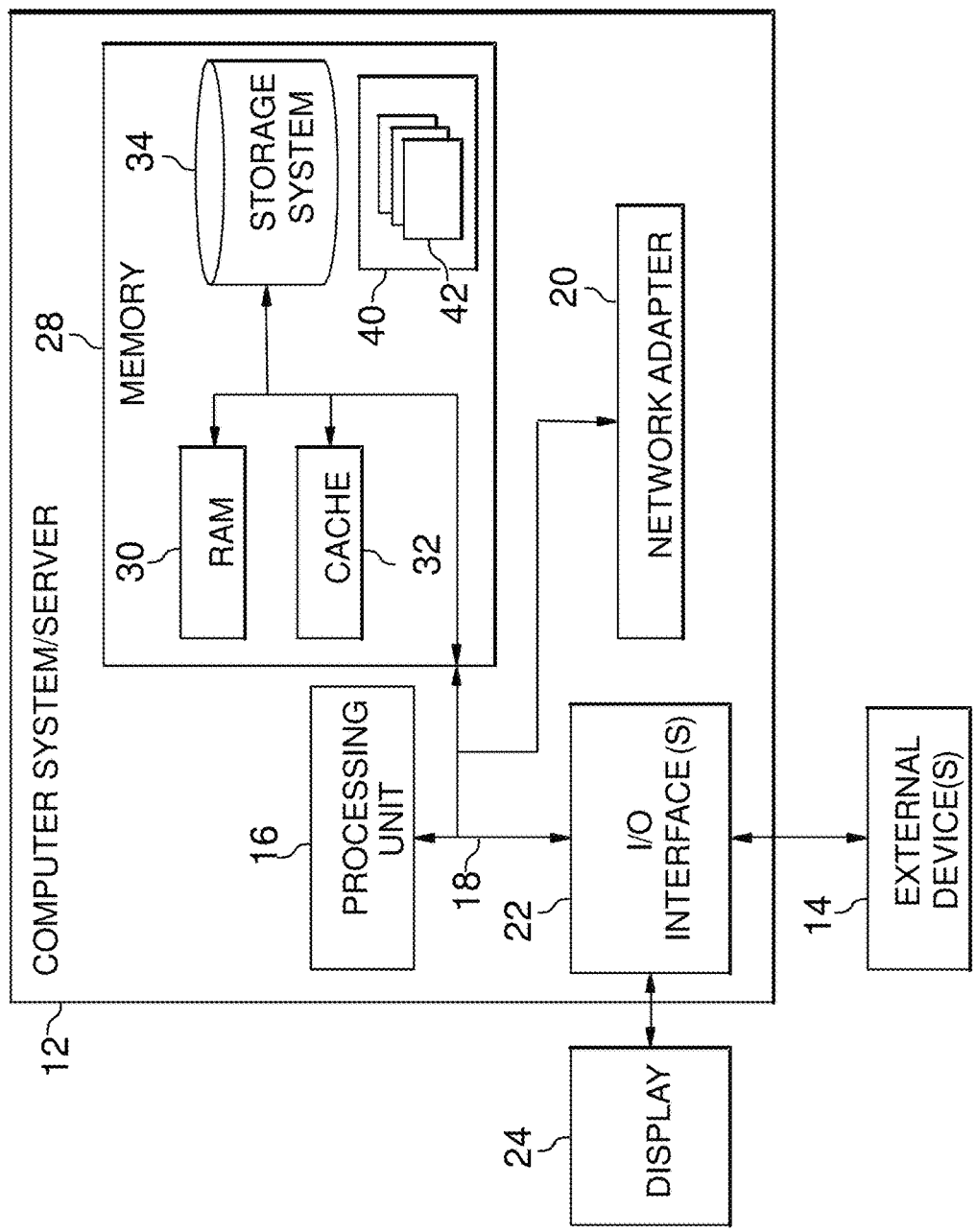
FIG. 1 depicts a cloud computing node in accordance with aspects of the invention.

The present invention generally relates to computing devices and, more particularly, to systems and methods for cache balance when using HTM. As described herein, aspects of the invention are directed to a system and method for regulating or limiting the use of HTM by an application, workload, or system when HTM usage by the application, workload, or system is damaging to or likely to damage the performance of one or more neighbor applications, workloads, or systems (e.g., when the application, workload, or system is flushing cache information at a rate exceeding a predetermined threshold).

While HTM provides performance benefits for parallel applications, the use of HTM carries the risk of reducing cache availability for one or more neighbor applications, workloads, or systems. If cache availability for the one or more neighbor applications, workloads, or systems is reduced, the performance of the one or more neighbor applications, workloads, or systems is likely to be reduced. For example, constant HTM requests by an application may cause locks in the L1 cache space that harm neighbor applications, workloads, or systems that are also using the same L1 cache space, causing information of the neighbor applications, workloads, or systems to be flushed from the cache and thereby negatively impacting their performance as their cache data may need to be rebuilt.

Aspects of the invention address these performance issues among multiple applications, workloads, or systems in competitive environments. In particular, embodiments provide a new performance monitoring unit (PMU) event/metric, e.g. FLUSH_BY_HTM, that assesses the flush of cache lines due to the HTM transaction growth. In embodiments, a new hardware transaction will only start if an HTM attrition rate, determined using the FLUSH_BY_HTM metric, is smaller than a predetermined threshold (e.g., a threshold specified by an operating system environment variable, kernel parameter, etc.). Otherwise, the transaction will fail to start, returning-BUSY, for example. Embodiments use the new PMU metric to determine how much the HTM use is affecting the performance of neighbor applications, workloads, or systems and then limit the access from the requester to the HTM, in order to avoid degrading the performance of the neighbor applications, workloads, or systems.

Accordingly, embodiments of the invention improve the functioning of a computer by regulating or limiting the use of HTM by an application, workload, or system when HTM usage by that application, workload, or system is damaging to or likely to damage the performance of one or more neighbor applications, workloads, or systems. Additionally, embodiments of the invention improve the functioning of a computer by providing a new metric (e.g., FLUSH_BY_HTM) that counts how many times a cache (e.g., L1 cache) has been flushed due to HTM transactions. This measures HTM interference on the cache being used by workloads running systemwide. Embodiments of the invention improve the functioning of a computer by providing a rule that controls how memory operations are performed in the cache. This rule uses the new metric that counts how many times the cache has been flushed due to HTM transactions to determine whether or not to allow a requested HTM transaction to begin.

Embodiments of the invention also improve the functioning of a computer by providing a rule for balancing the system's cache use between HTM transactions and non-HTM workloads by limiting the transaction size, therefore avoiding monopolization of the system's cache by HTM and avoiding an associated performance hit for the non-HTM workloads running on the system. Furthermore, embodiments of the invention improve the functioning of a computer by providing a rule for limiting the HTM transaction size using a threshold for the system's cache usage. The HTM transaction size limit is the percentage of system's cache that can be used for HTM that may be predefined by the system operator and force an HTM transaction to return BUSY when the size of transactions reaches the threshold. Additionally, the system uses techniques that are, by definition, rooted in computer technology (e.g., HTM, computer applications/systems, and cloud computing workloads), do not have a pre-computer analog, and cannot be performed manually by a person.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
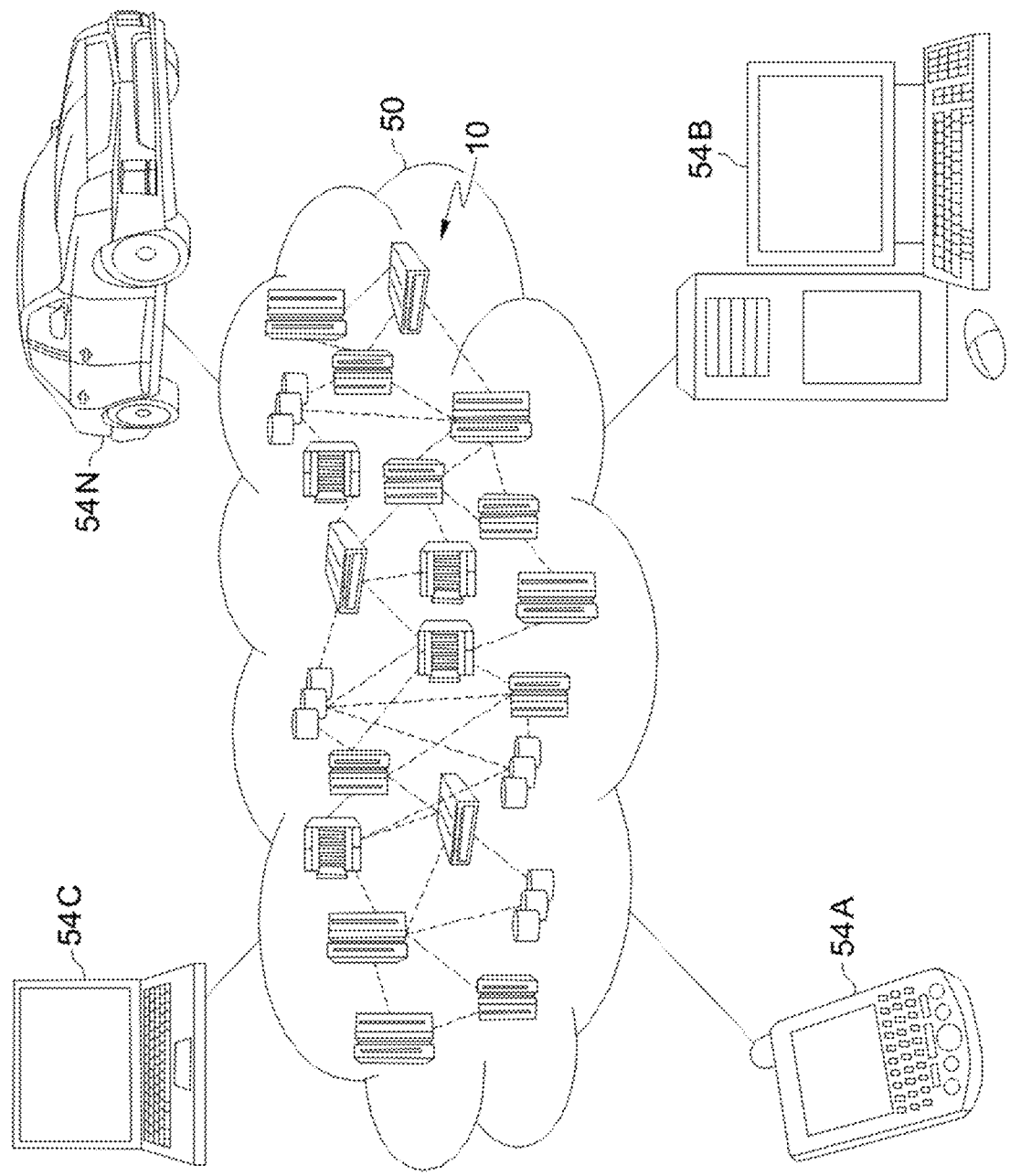
FIG. 2 depicts a cloud computing environment in accordance with aspects of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
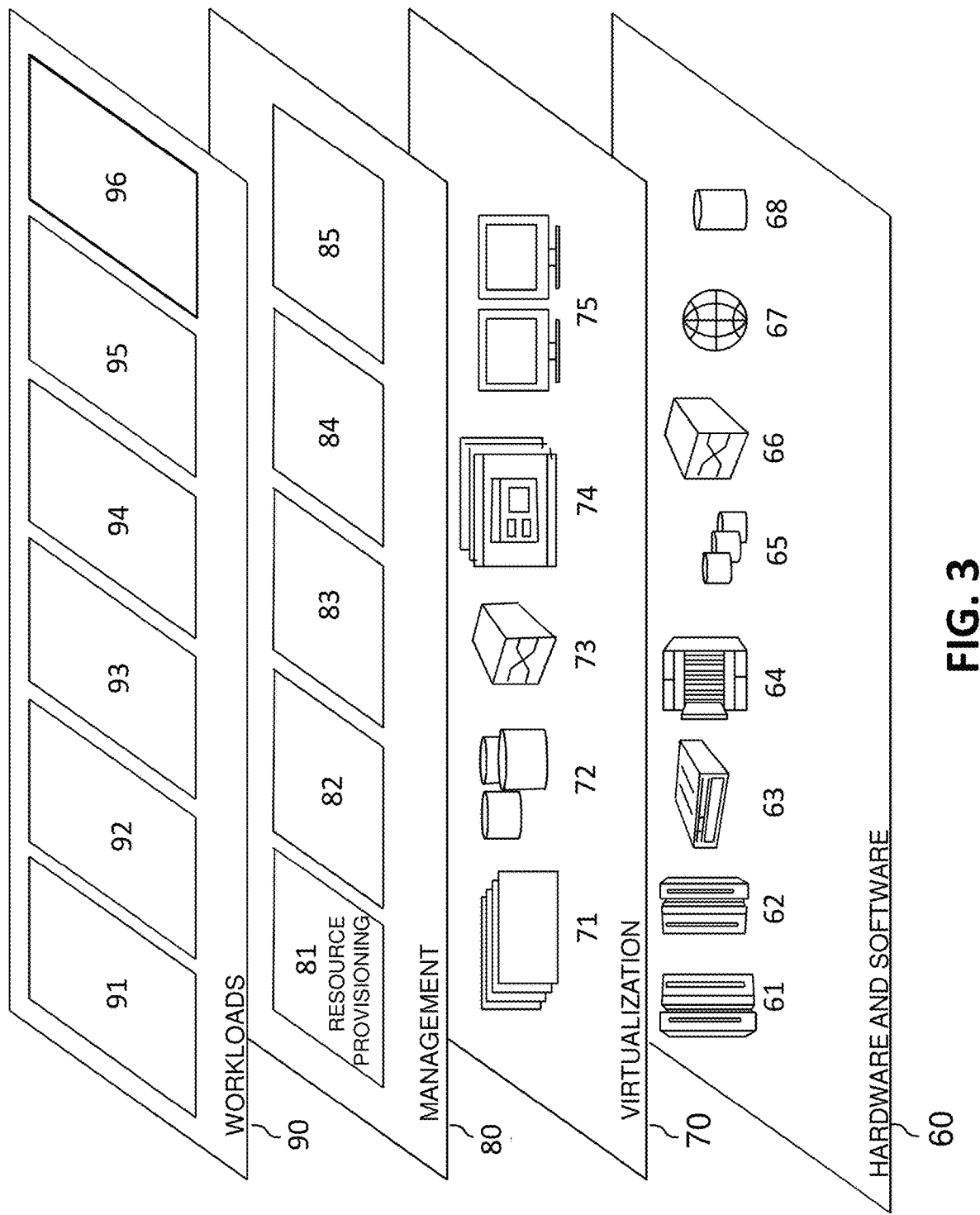
FIG. 3 depicts abstraction model layers in accordance with aspects of the invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Referring back to FIG. 1, the program/utility 40 may include one or more program modules 42 that generally carry out the functions and/or methodologies of embodiments of the invention as described herein (e.g., such as the functionality provided by resource provisioning 81). Specifically, the program modules 42 provide for regulating or limiting the use of HTM by an application, workload, or system when HTM usage is damaging to or likely to damage the performance of one or more neighbor applications, workloads, or systems (e.g., when the workload or system is flushing cache information at a rate exceeding a predetermined threshold). Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a cloud computing node 410-1, 410-2, . . . , 410-n as shown in FIG. 4.

Figure 4:
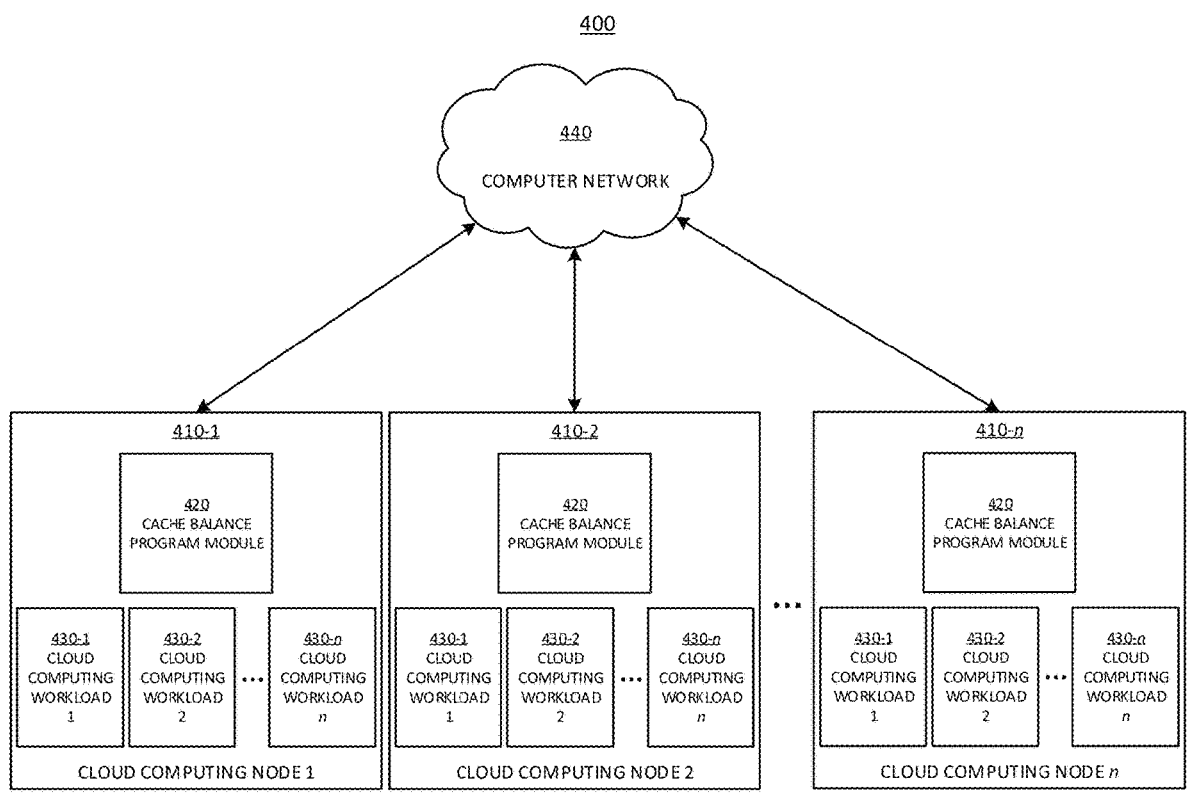
FIG. 4 depicts an illustrative environment in accordance with aspects of the invention.

FIG. 4 depicts an illustrative environment 400 in accordance with aspects of the invention. As shown, the environment 400 comprises cloud computing nodes 410-1, 410-2, . . . , 410-n, that are in communication with each other via a computer network 440. The computer network 440 may be any suitable network such as a LAN, WAN, or the Internet. The cloud computing nodes 410-1, 410-2, . . . , 410-n may be physically collocated, or may be situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the cloud computing nodes 410-1, 410-2, . . . , 410-n in the environment 400 may be situated in the cloud computing environment 50 and may be one or more of the nodes 10 shown in FIG. 2. The cloud computing nodes 410-1, 410-2, . . . , 410-n may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, each of the cloud computing nodes 410-1, 410-2, . . . , 410-n includes a cache balance program module 420 and cloud computing workloads 430-1, 430-2, . . . , 430-n, each of which may include hardware and/or software and may be one or more of the program modules 42 shown in FIG. 1. The cache balance program module 420 includes program instructions for regulating or limiting the use of HTM by each of the cloud computing workloads 430-1, 430-2, . . . , 430-n when HTM usage by the workload is damaging to or likely to damage the performance of one or more of the other the cloud computing workloads 430-1, 430-2, . . . , 430-n. The cloud computing workloads 430-1, 430-2, . . . , 430-n may be one or more of the workloads and functions provided by workloads layer 90 of FIG. 3. The program instructions included in the cache balance program module 420 and the cloud computing workloads 430-1, 430-2, . . . , 430-n of each of the cloud computing nodes 410-1, 410-2, . . . , 410-n may be executed by one or more hardware processors.

Figure 5:
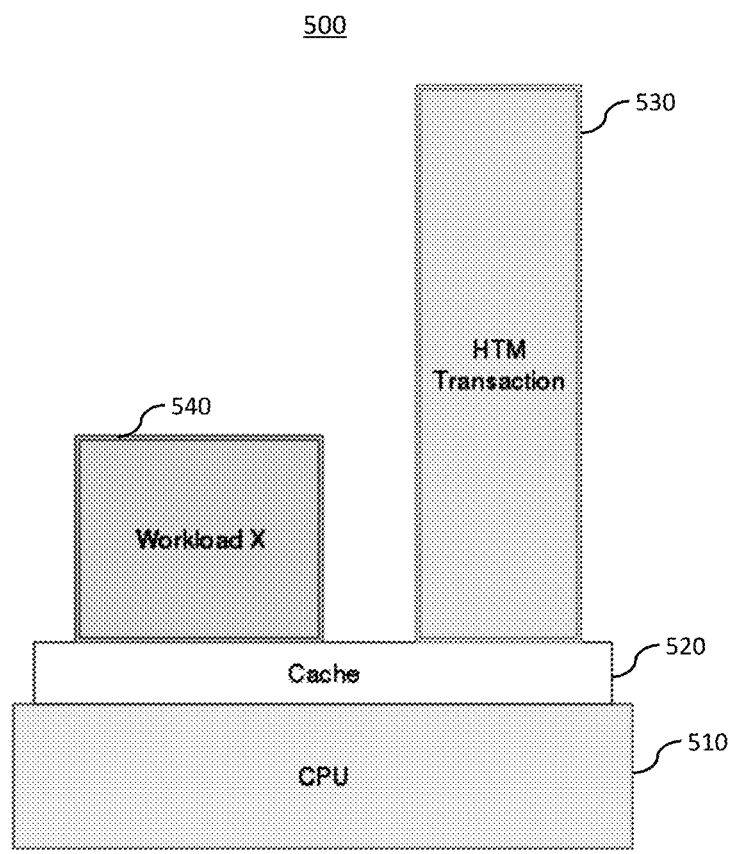
FIG. 5 depicts an illustrative CPU architecture including a CPU and a cache in accordance with aspects of the invention.

FIG. 5 depicts an illustrative CPU architecture 500 in accordance with aspects of the invention. The CPU architecture 500 may be used to implement each of the cloud computing nodes 410-1, 410-2, . . . , 410-n. The CPU architecture 500 includes a CPU 510 which may be one or more of the processing units 16 shown in FIG. 1 and a cache 520 which may be the cache 32 shown in FIG. 1. In the CPU architecture 500, the cache 520 is used for HTM transaction 530 (e.g., by one of the cloud computing workloads 430-1, 430-2, . . . , 430-n of FIG. 4) and workload x 540 (e.g., another of the cloud computing workloads 430-1, 430-2, . . . , 430-n of FIG. 4).

Figure 6:
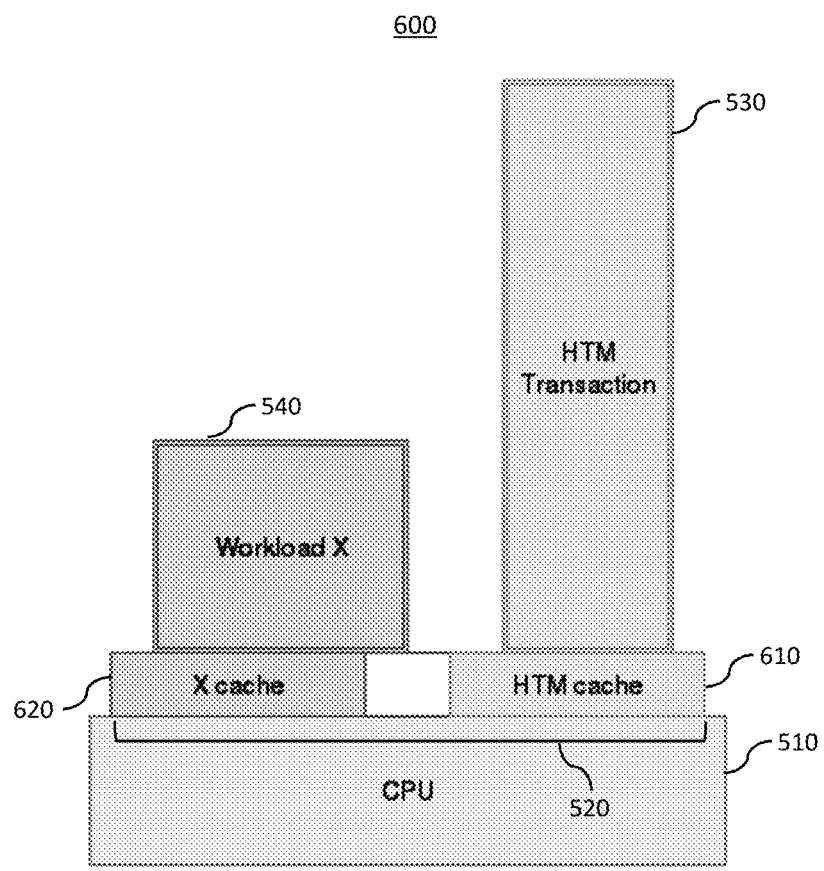
FIG. 6 depicts an illustrative CPU architecture with balanced cache usage in accordance with aspects of the invention.

FIG. 6 depicts an illustrative CPU architecture 600 in accordance with aspects of the invention. The CPU architecture 600 may be used to implement each of the cloud computing nodes 410-1, 410-2, . . . , 410-n, with balanced cache usage. The CPU architecture 600 includes the CPU 510 and the cache 520. In the CPU architecture 600, usage of the cache 520 is balanced between HTM cache 610 which is the portion of the cache 520 used by the HTM transaction 530 and the x cache 620 which is the portion of the cache 520 used by the workload x 540. The cache balance illustrated in FIG. 6 is achieved by the cache balance program module 420 of FIG. 4, as described herein.

Figure 7:
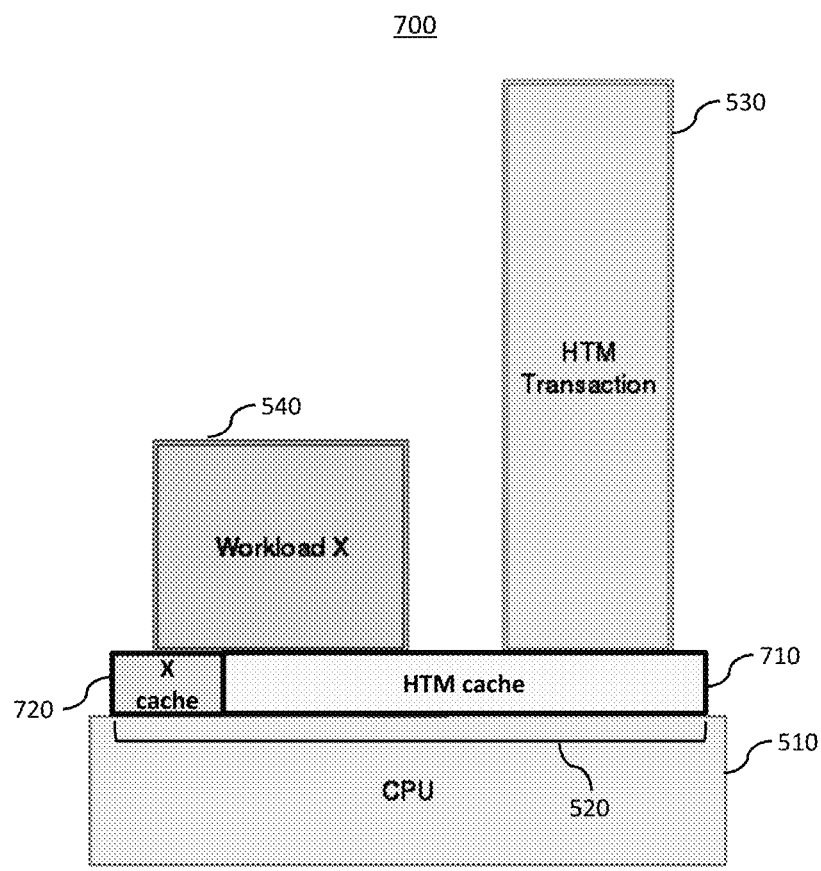
FIG. 7 depicts a CPU architecture with unbalanced cache usage.

FIG. 7 depicts a CPU architecture 700 with unbalanced cache usage, including the CPU 510 and the cache 520. In the CPU architecture 700, which does not utilize the cache balance program module 420 for cache balancing, usage of the cache 520 is not balanced between HTM cache 710 which is the portion of the cache 520 used by the HTM transaction 530 and x cache 720 which is the portion of the cache 520 used by the workload x 540. In FIG. 7, use of the cache 520 is monopolized by the HTM transaction 530 which uses the HTM cache 710, and other workloads such as workload x 540 suffer from a performance hit due to the limited amount of the cache 520 available for use by the workload x 540 as the x cache 720.

Figure 8:
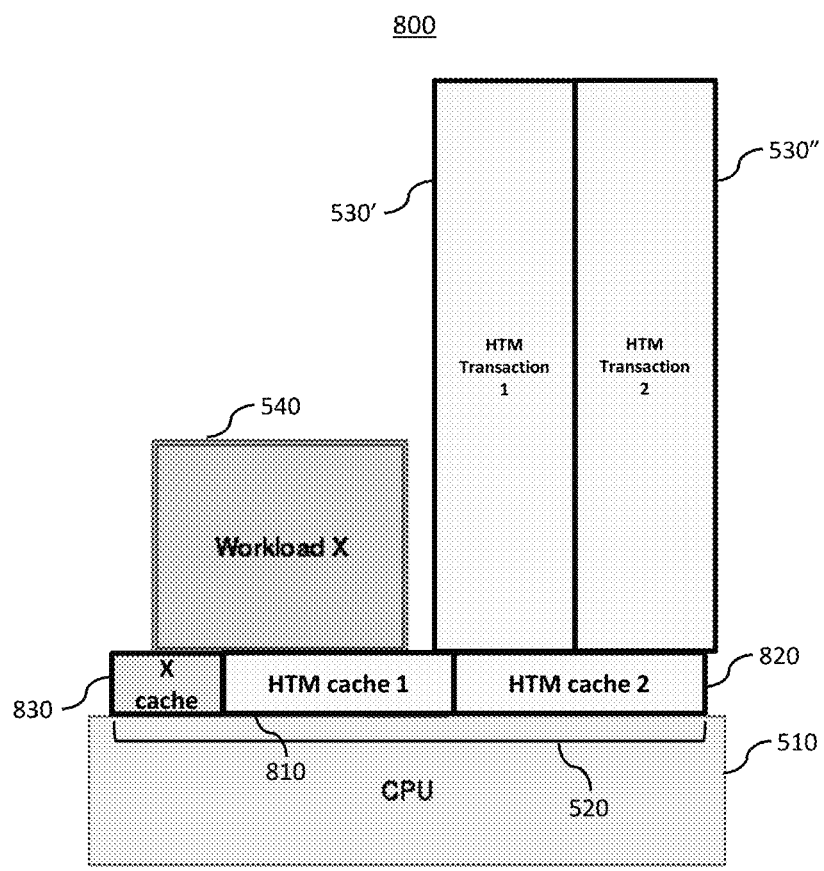
FIG. 8 depicts another CPU architecture with unbalanced cache usage.

FIG. 8 depicts another example of a CPU architecture 800 with unbalanced cache usage, including the CPU 510 and the cache 520. In the CPU architecture 800, which does not utilize the cache balance program module 420 for cache balancing, usage of the cache 520 is not balanced between HTM cache 1 810 which is the portion of the cache 520 used by HTM transaction 1 530', HTM cache 2 820 which is the portion of the cache 520 used by HTM transaction 2 530'', and x cache 830 which is the portion of the cache 520 used by the workload x 540. In FIG. 8, use of the cache 520 is monopolized by the HTM transaction 1 530' which uses the HTM cache 1 810 and the HTM transaction 2 530'' which uses the HTM cache 2 820. The HTM transaction 1 530' and the HTM transaction 2 530'' may both be associated with a single cloud computing workload (e.g., one of the cloud computing workloads 430-1, 430-2, . . . , 430-$n$ of FIG. 4) or may be associated with different cloud computing workloads (e.g., two of the cloud computing workloads 430-1, 430-2, . . . , 430-$n$ of FIG. 4). The monopolization of the cache 520 by the HTM transaction 1 530' and the HTM transaction 2 530'' results in other workloads such as workload x 540 suffering from a performance hit due to the limited amount of the cache 520 available for use by the workload x 540 as the x cache 830.

Figure 9:
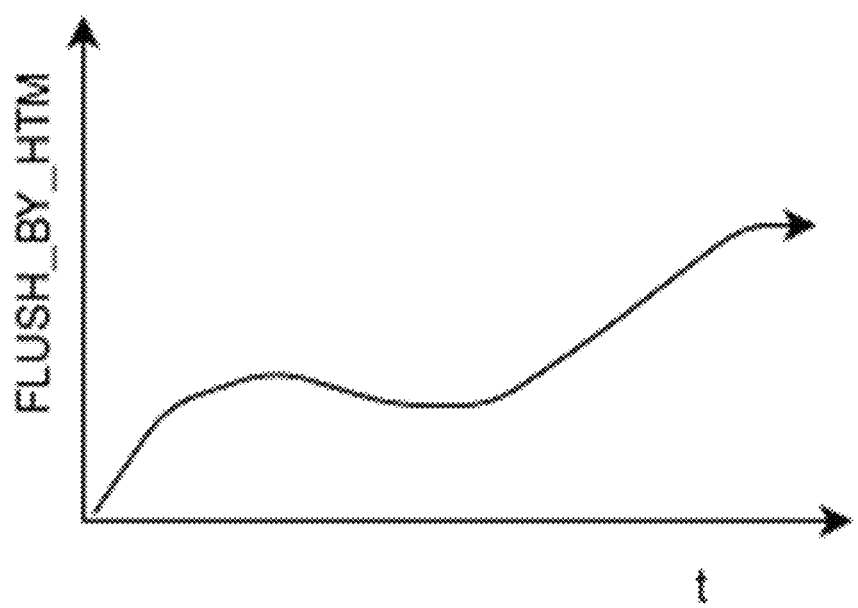
FIG. 9 depicts an example of a new performance monitoring unit event/metric in accordance with aspects of the invention.

FIG. 9 depicts an example of the new PMU event/metric, referred to as FLUSH_BY_HTM, provided by embodiments of the invention. The FLUSH_BY_HTM event/metric assesses the flush of cache lines due to the HTM transaction growth. In particular, the FLUSH_BY_HTM metric tracks a number of times that a transaction using HTM is started but not committed (i.e., the transaction is dropped), resulting in a cache flush.

While HTM transactions may be dropped for legitimate reasons (e.g., due to serializability conflicts, CPU interrupts, or context switches), malicious code may create and then intentionally drop HTM transactions in order to decrease the amount of cache available to neighbor applications, workloads, or systems. The FLUSH_BY_HTM event/metric tracks cache flush events resulting from both legitimate HTM transactions that are dropped due to conflicts and HTM transactions that are intentionally dropped by malicious code.

In FIG. 9, the vertical axis represents a number of cache flush events (FLUSH_BY_HTM) (e.g., occurring over a block of cycles and associated with a particular workload of the cloud computing workloads 430-1, 430-2, . . . , 430-$n$), and the horizontal axis represents time (e.g., measured in blocks of cycles). In embodiments, the FLUSH_BY_HTM event/metric is monitored and tracked by the cache balance program module 420, one or more hardware processors executing the cloud computing workloads 430-1, 430-2, . . . , 430-$n$, and/or an operating system of each of the cloud computing nodes 410-1, 410-2, . . . , 410-$n$.

According to another embodiment, a PMU new event/metric, referred to as PM_GL_CA_FL_L1_HTM, may be provided that tracks global L1 cache flush due to HTM. As with the FLUSH_BY_HTM event/metric, the PM_GL_CA_FL_L1_HTM metric may be monitored and tracked by the cache balance program module 420, one or more hardware processors executing the cloud computing workloads 430-1, 430-2, . . . , 430-$n$, and/or an operating system of each of the cloud computing nodes 410-1, 410-2, . . . , 410-$n$. The PM_GL_CA_FL_L1_HTM metric may be used in place of or in addition to the FLUSH_BY_HTM metric as described herein.

Figure 10:
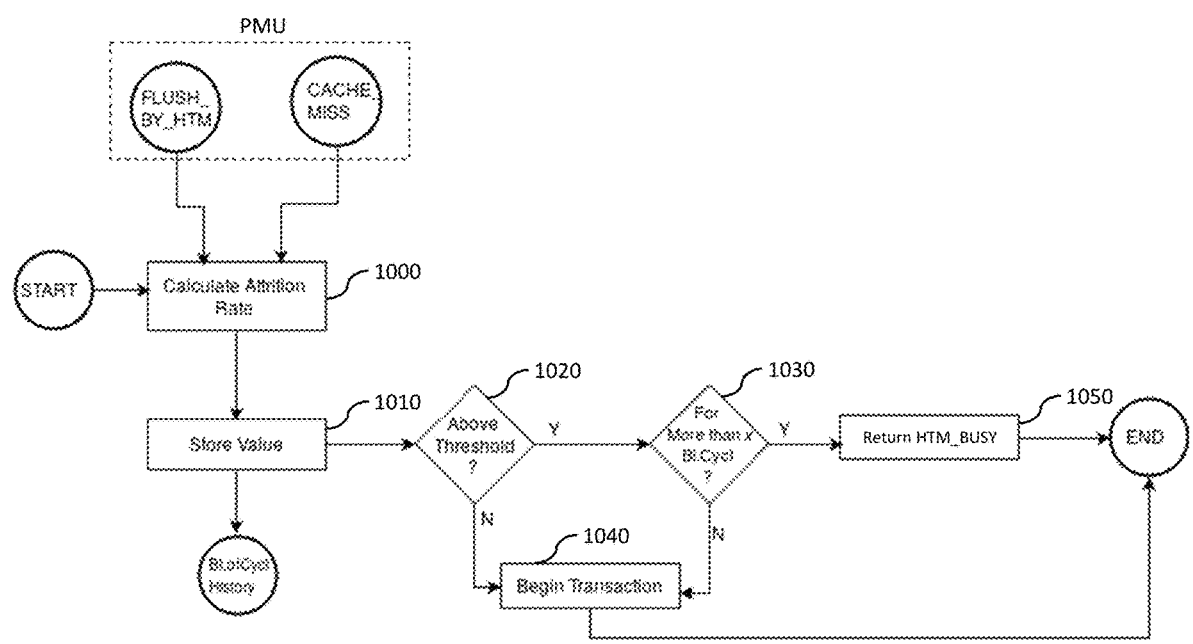
FIG. 10 depicts a flowchart of an exemplary method in accordance with aspects of the invention.

FIG. 10 depicts a flowchart of an exemplary method in accordance with aspects of the invention. The steps of the method may be performed in the environment of FIG. 4 by the cache balance program module 420 of each of the cloud computing nodes 410-1, 410-2, . . . , 410-$n$. The steps of the method may be performed at predetermined intervals (e.g., once per block of cycles) for each of the cloud computing workloads 430-1, 430-2, . . . , 430-$n$. Alternatively, the steps of the method may be performed in response to one of the cloud computing workloads 430-1, 430-2, . . . , 430-$n$ requesting an HTM transaction.

At step 1000, the cache balance program module 420 calculates an HTM attrition rate (e.g., for a particular workload of the cloud computing workloads 430-1, 430-2, . . . , 430-$n$). In particular, the cache balance program module 420 receives current values (e.g., for the current block of cycles) for the PMU metrics FLUSH_BY_HTM and CACHE_MISS. (The PMU metric CACHE_MISS tracks a number of instructions associated with the cloud computing workloads 430-1, 430-2, . . . , 430-$n$ resulting in a cache miss, which is a state where the data requested for processing is not found in the cache memory.) The cache balance program module 420 then calculates the attrition rate for the current block of cycles by dividing the value for the FLUSH_BY_HTM metric by the value for the CACHE_MISS metric.

At step 1010, the cache balance program module 420 stores the attrition rate for the current block of cycles calculated at step 1000. In particular, the cache balance program module 420 stores the calculated attrition rate for the current block of cycles in association with information identifying the current block of cycles (e.g., a block identification number or another unique identifier for the current block of cycles) into a memory of the cloud computing node 410-1, 410-2, . . . , 410-$n$ (e.g., the memory 28 including the ram 30, the cache 32, and the storage system 34 as shown in FIG. 1).

At step 1020, the cache balance program module 420 determines whether or not the attrition rate calculated at step 1000 is above a threshold value. If the cache balance program module 420 determines that the attrition rate is above the threshold value, then the flow proceeds to step 1030. On the other hand, if the cache balance program module 420 determines that the attrition rate is not above the threshold value, then the flow proceeds to step 1040.

The threshold value used by the cache balance program module 420 at step 1020 may be a value that is predetermined based on a size of a cache (e.g., a size of the L1 cache) or other system factors. Alternatively, the threshold value may be a value that is specified by a system administrator. For example, if a system has no other users, the system administrator may specify a higher (i.e., more permissive) threshold value since there is no risk of an application affecting the performance of other users' applications. On the other hand, if the system has many other users, the system administrator may specify a lower (i.e., more restrictive) threshold value since there is a comparatively high risk of an application affecting the performance of other users' applications.

At step 1030, in response to the cache balance program module 420 determining at step 1020 that the attrition rate is above the threshold value, the cache balance program module 420 determines whether or not the attrition rate has been above the threshold value for more than a predetermined number of blocks of cycles. In particular, the cache balance program module 420 checks the memory of the cloud computing node 410-1, 410-2, . . . , 410-n to determine whether or not the attrition rate for each of the predetermined number of previous blocks of cycles is also above the threshold value. In embodiments, the predetermined number of blocks of cycles is three. However, other values may also be used.

If at step 1030 it is determined not to be the case that the attrition rate for each of the predetermined number of previous blocks of cycles is also above the threshold value (e.g., at least one of the most recent three blocks of cycles has an attrition rate that is not above the threshold value), then the flow proceeds to step 1040. On the other hand, if it is the case that the attrition rate for each of the predetermined number of previous blocks of cycles is also above the threshold value (e.g., all of the most recent three blocks of cycles have an attrition rate that is above the threshold value), then the flow proceeds to step 1050.

At step 1040, either in response to the cache balance program module 420 determining at step 1020 that the attrition rate is not above the threshold value or in response to the cache balance program module 420 determining at step 1030 that it is not the case that the attrition rate for each of the predetermined number of previous blocks of cycles is also above the threshold value, then the cache balance program module 420 causes an HTM transaction to begin in response to a request for the HTM transaction (e.g., a HTM transaction associated with the particular workload of the cloud computing workloads 430-1, 430-2, . . . , 430-n for which the attrition rate is calculated at step 1000). The flow then ends after step 1040.

At step 1050, in response to the cache balance program module 420 determining at step 1030 that it is the case that the attrition rate for each of the predetermined number of previous blocks of cycles is also above the threshold value, then the cache balance program module 420 does not allow an HTM transaction to begin in response to a request for an HTM transaction from the particular workload of the cloud computing workloads 430-1, 430-2, . . . , 430-n for which the attrition rate is calculated at step 1000 and instead forces the workload to fallback to software transactional memory. The flow then ends after step 1050.

For example, at step 1050, the cache balance program module 420 may return HTM_BUSY to the particular workload in response to the request for the HTM transaction. The cache balance program module 420 may also determine that the particular workload is a malicious effort to slow down the particular cloud computing node (of the cloud computing nodes 410-1, 401-2, . . . , 410-n) on which the particular workload is located.

According to another embodiment, at step 1030, if the cache balance program module 420 determines that the attrition rate for each of the predetermined number of previous blocks of cycles is also above the threshold value (e.g., all of the most recent three blocks of cycles have an attrition rate that is above the threshold value), then the cache balance program module may also determine whether or not a size of a requested HTM transaction exceeds a predetermined threshold. If the cache balance program module 420 determines that the size of the requested transaction does not exceed the predetermined threshold, then the flow proceeds to step 1040. On the other hand, if the cache balance program module 420 determines that the size of the requested transaction exceeds the predetermined threshold, then the flow proceeds to step 1050. The predetermined threshold may be determined based upon a transaction size above which HTM transactions are usually flushed. (In other words, small HTM transactions are less likely to result in cache flushes.)

In embodiments, in response to the cache balance program module 420 not allowing HTM transactions to begin (therefore forcing fallbacks to software transactional memory), the attrition rate will automatically decrease as HTM transactions are not being permitted. Specifically, the FLUSH_BY_HTM metric used by the cache balance program module 420 in calculating the attrition rate decreases in value as fewer HTM transactions are performed, and therefore the attrition rate will correspondingly decrease. Accordingly, after initially blocking an HTM transaction, the cache balance program module 420 may eventually allow the HTM transaction to be performed (in response to a subsequent request to start the HTM transaction) as the attrition rate decreases over time.

Figure 11:
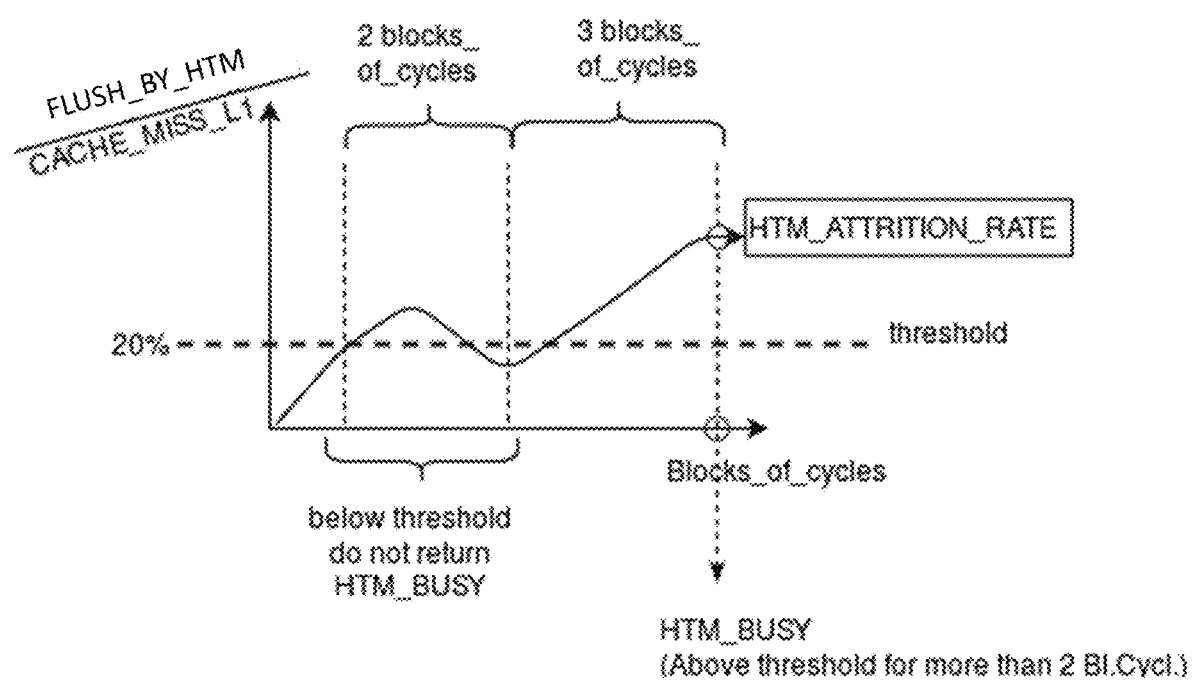
FIG. 11 depicts an illustrative example of an attrition rate determined by a cache balance program module in accordance with aspects of the invention.

FIG. 11 depicts an illustrative example of the attrition rate (e.g., HTM_ATTRITION_RATE) determined by the cache balance program module 420. As illustrated in FIG. 11, HTM_ATTRITION_RATE may be determined by dividing FLUSH_BY_HTM by CACHE_MISS, as described above with respect to step 1000 of FIG. 10. In the example of FIG. 11, as long as the HTM_ATTRITION_RATE does not exceed the threshold for more than two blocks of cycles, then HTM_BUSY is not returned and the cache balance program module 420 permits a requested HTM transaction to proceed. On the other hand, when the HTM_ATTRITION_RATE exceeds the threshold for more than two blocks of cycles, then the cache balance program module 420 causes HTM_BUSY to be returned in response to a request for an HTM transaction, and the workload requesting the HTM transaction is forced to fallback to software transactional memory.

According to another embodiment, the cache balance program module 420 includes a performance counter that measures, for each node of the cloud computing nodes 410-1, 410-2, . . . , 410-n, a rate at which HTM transactions are requested by all of the workloads running on the node. This performance counter may be used to limit an HTM transaction size on a node with a heavy HTM transaction load. Additionally, this performance counter may be used by a cloud scheduler to determine on which node of the cloud computing nodes 410-1, 410-2, . . . , 410-n to place a new workload that uses HTM transactions. For example, the workload may be placed on the node that has the lowest transaction rate or the node on which the workload will have the smallest impact, based on a cache size of the node.

According to yet another embodiment, the cache balance program module 420 may provide for an HTM transaction size limit, which is a predetermined maximum percentage of the system's cache that can be used for HTM. This predetermined maximum percentage may be predefined by the system operator, and the cache balance program module 420 may force an HTM transaction to return BUSY when the size of transactions reaches the predetermined maximum percentage of the system's cache that can be used for HTM.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   determining, by a computing device, a hardware transactional memory (HTM) attrition rate for a workload for a current block of cycles in a distributed computing environment;
   determining, by the computing device, that the HTM attrition rate for the workload for the current block of cycles exceeds a predetermined threshold;
   in response to determining that the HTM attrition rate for the workload for the current block of cycles exceeds the predetermined threshold, the computing device determining whether or not the HTM attrition rate has exceeded the predetermined threshold in each of a predetermined number of blocks of cycles preceding the current block of cycles; and
   in response to determining that the HTM attrition rate has not exceeded the predetermined threshold in each of the predetermined number of blocks of cycles preceding the current block of cycles, the computing device causing a requested HTM transaction to begin.

2. The method according to claim 1, wherein the determining the HTM attrition rate for the workload comprises:
   receiving information on a number of times a cache has been flushed due to HTM transactions;
   receiving information on a number of cache misses; and
   calculating the HTM attrition rate using the received information on the number of times the cache has been flushed due to HTM transactions and the received information on the number of cache misses.

3. The method according to claim 2, wherein:
   the determining the HTM attrition rate for the workload further comprises storing the calculated HTM attrition rate in a memory of the computing device.

4. The method according to claim 1, further comprising:
   in response to determining that the HTM attrition rate has exceeded the predetermined threshold in each of the predetermined number of blocks of cycles preceding the current block of cycles, the computing device preventing the requested HTM transaction from beginning.

5. The method according to claim 4, wherein the preventing the requested HTM transaction from beginning comprises the computing device forcing the workload to fallback to software transactional memory.

6. The method according to claim 5, wherein the forcing the workload to fallback to software transactional memory comprises returning HTM_BUSY to the workload.

7. The method according to claim 1, wherein the predetermined threshold is determined based on an operating system environment variable or kernel parameter.

8. The method according to claim 1, wherein the HTM attrition rate is determined using a FLUSH_BY_HTM metric.

9. The method according to claim 8, wherein the FLUSH_BY_HTM metric is a performance monitoring unit metric that assesses flush of cache lines due to HTM transaction growth.

10. The method according to claim 9, wherein the cache lines are in an L1 cache.

11. A computer program product comprising a computer readable storage medium having program instructions embodied therewith, the program instructions executable by a computing device to cause the computing device to:
    receive information on a number of times a cache has been flushed due to hardware transactional memory (HTM) transactions;
    receive information on a number of cache misses;
    determine that an HTM attrition rate for a workload in a distributed computing environment exceeds a predetermined threshold, using the received information on the number of times the cache has been flushed due to HTM transactions and the received information on the number of cache misses;
    in response to determining that the HTM attrition rate for the workload exceeds the predetermined threshold, determining whether or not the HTM attrition rate has exceeded the predetermined threshold in each of a predetermined number of blocks of cycles preceding a current block of cycles; and
    in response to determining that the HTM attrition rate has exceeded the predetermined threshold in each of the predetermined number of blocks of cycles preceding the current block of cycles, preventing an HTM transaction requested by the workload from beginning in response to a size of the HTM transaction exceeding a predetermined maximum HTM transaction size.

12. The computer program product according to claim 11, further comprising:
    in response to determining that the HTM attrition rate has not exceeded the predetermined threshold in each of the predetermined number of blocks of cycles preceding the current block of cycles, permitting the HTM transaction to begin.

13. The computer program product according to claim 11, wherein the preventing the HTM transaction from beginning comprises forcing the workload to fallback to software transactional memory.

14. The computer program product according to claim 13, wherein the forcing the workload to fallback to software transactional memory comprises returning HTM_BUSY to the workload.

15. The computer program product according to claim 11, further comprising:
in response to determining that the HTM attrition rate has exceeded the predetermined threshold in each of the predetermined number of blocks of cycles preceding the current block of cycles, permitting the HTM transaction to begin in response to the size of the HTM transaction not exceeding the predetermined maximum HTM transaction size.

16. A system comprising:
a hardware processor, a computer readable memory, and a computer readable storage medium associated with a computing device;
program instructions configured to determine a hardware transactional memory (HTM) attrition rate for a workload for a current block of cycles in a distributed computing environment;
program instructions configured to determine that the HTM attrition rate for the workload for the current block of cycles exceeds a predetermined threshold;
program instructions configured to determine whether or not the HTM attrition rate has exceeded the predetermined threshold in each of a predetermined number of blocks of cycles preceding the current block of cycles in response to determining that the HTM attrition rate for the workload for the current block of cycles exceeds the predetermined threshold; and
program instructions configured to cause a requested HTM transaction to begin in response to determining that the HTM attrition rate has not exceeded the predetermined threshold in each of the predetermined number of blocks of cycles preceding the current block of cycles,
wherein the program instructions are stored on the computer readable storage medium for execution by the hardware processor via the computer readable memory.

17. The system according to claim 16, wherein the determining the HTM attrition rate for the workload comprises:
receiving information on a number of times a cache has been flushed due to HTM transactions;
receiving information on a number of cache misses; and
calculating the HTM attrition rate using the received information on the number of times the cache has been flushed due to HTM transactions and the received information on the number of cache misses.

18. The system according to claim 17, wherein:
the determining the HTM attrition rate for the workload further comprises storing the calculated HTM attrition rate in a memory of the computing device.

19. The system according to claim 16, further comprising program instructions configured to prevent the requested HTM transaction from beginning, in response to determining that the HTM attrition rate has exceeded the predetermined threshold in each of the predetermined number of blocks of cycles preceding the current block of cycles.

20. The system according to claim 19, wherein the preventing the requested HTM transaction from beginning comprises the computing device forcing the workload to fallback to software transactional memory.

* * * * *